Jan. 24, 1939.  W. B. BARNES  2,144,787
OVERDRIVE TRANSMISSION AND CLUTCH
Filed Aug. 3, 1934
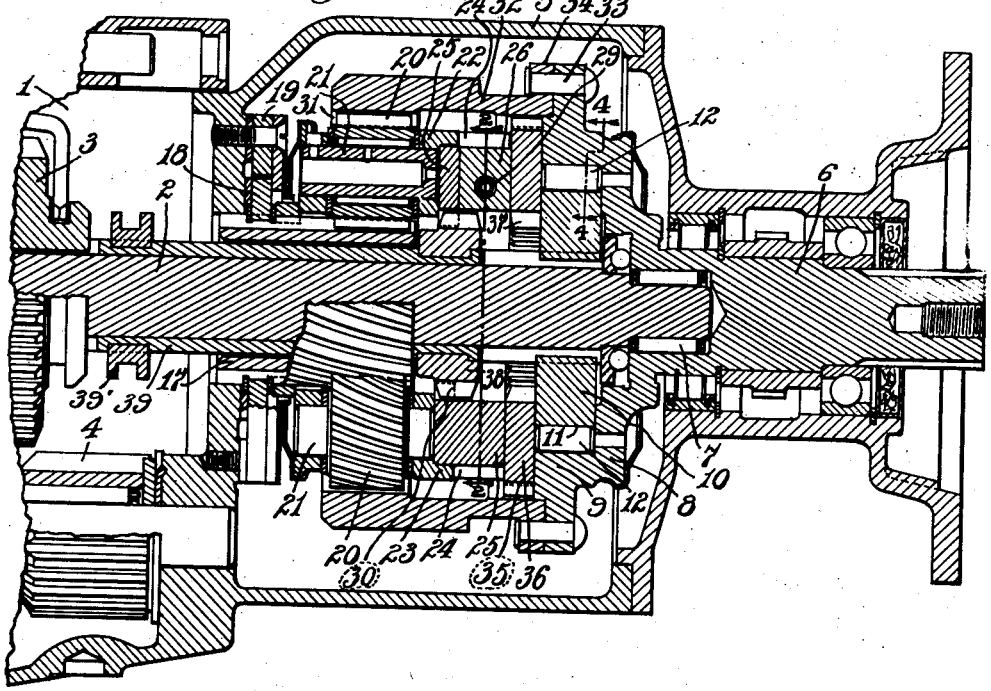
INVENTOR
William B. Barnes,
BY
Hood & Hahn
ATTORNEYS Patented Jan. 24, 1939

2,144,787

UNITED STATES PATENT OFFICE 2,144,787

OVERDRIVE TRANSMISSION AND CLUTCH

William B. Barnes, Indianapolis, Ind., assignor to Barnes Motor Developments Company, Muncie, Ind., a partnership composed of said William B. Barnes and Freda Arthur Barnes Application August 3, 1934, Serial No. 738,190

4 Claims. (Cl. 74—260)

My invention relates to improvements in automobile transmissions and particularly to a type of transmission primarily intended for supplementing the ordinary three-speed transmission of an automobile to provide an overspeed drive.

My invention in one of its most practical forms is adapted to provide an overspeed drive, when desirable, at the will of the operator, and to provide a free wheeling drive, at the will of the operator, when desired, as well as what may be termed a direct drive.

It is one of the objects of my invention to provide a structure of this character wherein the parts may be readily assembled and the operating or controlling mechanism, while efficient, may be extremely simple.

For the purpose of disclosing my invention I have illustrated certain embodiments thereof in the accompanying drawing in which Fig. 1 is a longitudinal sectional view of an overspeed drive embodying my invention;

Fig. 2 is a transverse sectional view taken on the line 2—2 of Fig. 1, showing the automatic clutch mechanism;

Fig. 3 is a similar sectional view showing a modified form of the clutch mechanism, and Fig. 4 is a detail section on line 4—4 of Fig. 1 showing a detail of the overrunning clutch mechanism.

In the embodiment illustrated I provide the usual transmission 1, only part of which is shown, which transmission is provided with the usual three speeds forward and one reverse. The driven shaft 2 of this transmission, which in the present structure becomes a driving shaft of the overspeed transmission, is of the usual type and I have illustrated the low speed shiftable gear 3 on this shaft as well as a reverse gear drive 4 on a countershaft.

Associated with this transmission is the overspeed drive enclosed in a casing 5, preferably secured to or forming a part of the casing enclosing the transmission proper. The shaft 2 extends into this casing 5 and practically throughout its length being piloted at its rear end in the front end of a shaft 6 suitably extending into the rear end of the casing 5 and connected, by any suitable means, with the propeller shaft of the vehicle. To the end that the shaft 2 may be piloted in the shaft 6, the shaft 6 is provided with a suitable recess for receiving a reduced end of the shaft 2, which is journaled in roller bearings 7.

This shaft 6 is provided with what may be termed a driving member 8 which is preferably formed integrally with the shaft 6 and is provided with an overhanging portion 9 constituting the outer member of an overrunning clutch. The inner member 10 of this overrunning clutch is splined on the shaft 2 and is provided with cammed surfaces 11. Between these cam surfaces and the surface of the outer member 9 are interposed suitable wedging rollers 12 which, when the clutch is operating in one direction will permit the outer member to run independently of the inner member but which, when the clutch is operated in the reverse direction, will connect the members. The rollers 12 are biased towards wedging or engaging position by suitable coiled springs 13 arranged in projections 14 on the inner member 10, and in practice I have found that there is a tendency for these springs to break. In order to avoid the breakage of these springs I provide a shoe 15 on the end of a stem 16 which extends through the spring and through the projection 14. I have found that the best results are obtained by forming the shoe 15 in the form of a perfectly round head, struck up on the end of the steel pin 16.

The overspeed drive of the structure is preferably in the form of a planetary gear. The sun gear of this planetary train is in the form of teeth formed on the end of a sleeve 17 surrounding the shaft 2 and this sleeve has a splined or toothed connection with an anchoring member 18 resiliently, through the interposition of suitable springs, connected to a holding member 19 secured to a wall of the casing. In this manner the sun gear is held against substantial rotation in either direction but the coiled springs and resilient connection take up a great deal of the vibration set up in the sun gear and prevent the transmission thereof to the casing, thus eliminating or preventing noise.

The pinion gears 20 of this transmission are preferably mounted on hollow pinions 21 carried in a pinion cage or carrier including a ring member 22, forming also one portion of an automatic centrifugally-operated clutch to be more fully hereinafter described.

The automatic clutch is adapted for the purpose of establishing driving connection between the shaft 2 and the shaft 6 through the overspeed drive under certain speed conditions. To this end the ring member 22 is provided with an annular rim 23 having a series, preferably four, of clutch openings 24 therein.

Arranged within the ring 23 is a dog member 25. This dog member has a radial slot formed therein in which is arranged a radially-movable dog 26 adapted when the part 23 and the part 25 reach, during their rotation, synchronism, to, under the influence of centrifugal force, engage in the slot 24 and lock the two parts together. In the two opposite walls of the dog-receiving slot in the part 25 is formed a pair of ball or poppet notches, the walls 27 of which are inclined upwardly and toward the face of the slot. Mounted in the dog 26 is a pair of poppet balls 28 biased into engaging position in their notches 27 by a coiled spring 29 arranged in an opening extending through the dog 26 and bearing against the poppets. By this arrangement the dogs 26 are maintained in their retracted position until the speed of the member 25 develops sufficient centrifugal force in the dog 26 to cause it to overcome the force of the spring 29, moving radially outward into engagement in one of the notches 24. Due to the fact that the poppets 28 are constantly bearing, when the dog is in its engaged position, that is, when the dog is in its outermost position on an inclined surface, there is a constant tendency for the poppets under the influence of the spring to retract the dog, which will, of course, happen as soon as the speed of the member 25 drops down to the point where the centrifugal force acting upon the dog 26 is less than the force acting through the spring to retract the dog.

The dog-carrying member 25 surrounds the shaft 2 and is provided with a series of teeth 30 for a purpose more fully hereinafter to appear.

The pinions 20 are adapted to mesh with a ring gear 31 formed in a ring gear carrier 32, which is in turn secured to the member 9 on the shaft 6 through the medium of suitable bolts or rivets 33 passing through the member 9 and an annular flange 34, on the ring gear carrier 32. This ring gear carrier at the point where it abuts the member 9 is provided with internal teeth 35 engaging in radial teeth on a locking ring 36. By this arrangement the locking ring is non-rotatably connected to the shaft 6. This locking ring is provided with a set of internal teeth 37 which cooperate with a lockout member, hereinafter described.

This lockout member preferably comprises a ring 38 secured on an axially-shiftable member 39 surrounding the shaft 2 and extending through the sun gear sleeve 17. The ring 38 is preferably secured in an annular groove in the axially-shiftable member 39 and this axially-shiftable member is splined to the shaft 2, so that the ring 38 and axially-shiftable member 39 are splined to rotate with the shaft 2. For shifting this axially-shiftable member I provide a shift ring 39' adapted to be engaged by a suitable shift fork. In operation, when the teeth of the member 38 are in engagement with the teeth 37 a direct drive between the shafts 2 and 6 will be established through the axially-shiftable member, the drive member 9 and the shafts, and there will be no opportunity for the overdrive transmission to operate; also the overrunning clutch will be locked out. If it is desired to operate through a free wheeling drive the member 38 is shifted to the left a sufficient distance to disengage the teeth thereof from the teeth 37 but not sufficiently far to engage the teeth thereof with the teeth 30. Under these circumstances a direct drive will be established between the shafts through the overrunning clutch. If now, however, it is desired to place the overdrive in a position to become effective at a suitably predetermined speed, the axially-shiftable member 39 is shifted further to the left until the teeth on the ring 38 engage the teeth 30 on the dog carrier. This dog carrier is now driven by the shaft 2 and when the speed of the shaft 2 is raised to a sufficient point to cause the dog to throw out, the dog will move towards a position to engage in one of the slots 24. Due, however, to the peculiar construction of this clutch, and due to the peculiar camming face 40 of the dog, the dog will not slip into one of the slots 24 until the two parts of the clutch are operating in synchronism.

It will be noted that the end of the sleeve or splines 39, and it may be mentioned that this sleeve 39 may be in the form of a series of long splined members operating in the splines of the shaft 2 are in a position immediately behind the low and reverse gear 3 so that in event the drive is in overspeed hookup when the gear 3 is shifted to the right (looking at Fig. 1) into a reverse drive position the toothed member 38 will be shifted to engage the teeth thereof with the teeth 37, thus establishing a two-way drive between the shaft 2 and the shaft 6.

In Fig. 3 I have shown a modified form of the clutch illustrated in Fig. 2. In this structure instead of providing a pair of poppets 28 in the dog, I provide a single poppet 41 which is arranged in a recess 42 preferably drilled through from the periphery of the member 25 and behind this poppet I arrange a coiled spring 43 backed up by a set screw 44, by which the tension of the spring may be adjusted. In the dog 26' I provide a cammed surface 45 against which the poppet 41 operates. This construction provides a structure whereby the dog will be retracted under certain conditions and whereby the dog will be held against projection until a predetermined speed or a critical speed is reached. However, due to the fact that the spring and poppet force one face of the dog against one face of the slot in which it works, a certain amount of friction is established which not only tends to delay the action of the dog in throwing out, but also tends to delay the retracting action of the spring and in effect provides a more of a "snap" action than is provided in the structure illustrated in Fig. 2.

I claim as my invention:

1. In a power transmission for a motor vehicle, power driving means including a driving shaft, means including a shaft driven from said driving means and adapted to drive the vehicle, said driving and driven shafts being co-axially arranged for relative rotation, an internal gear rotatable with said driven shaft, a relatively fixed sun gear, a planetary pinion engaging said internal gear and said sun gear, a planetary pinion cage, clutching structures adapted when declutched to be driven from said planetary pinion cage and by said driving means respectively, said clutching structures being adapted when clutched to provide a drive from said driving means to said driven means, and an overruning clutch including driving and driven portions thereof respectively drivingly associated with said driving means and said driven means whereby to transmit a one-way drive therebetween, said driven means overrunning said driving means when said driven means is driven from said driving means through said clutching structures, one of said clutching structures including a centrifugal force actuated element adapted for positive clutching engagement with the other of said structures.

2. In a vehicle drive, a speed ratio changing transmission having a power take-off driving shaft, an overdriving mechanism associated with said transmission and having a shaft aligned with said driving shaft and adapted to be driven therefrom for driving the vehicle, an overrunning clutch intermediate said driving and driven shafts adapted to transmit a direct drive therebetween, speed responsive clutch means including driving and driven clutching structures adapted for clutching action in response to substantially synchronized rotation thereof at or above a predetermined speed, means for driving one of said structures from said driving shaft, and means for driving the other of said structures from said driven shaft, the last said driving means including planetary gearing having a relatively stationary sun gear through which said driving shaft extends, said driving means being adapted to drive said structures at relatively different speeds when said driving shaft drives said driven shaft through said overrunning clutch, said clutching structures being adapted to establish a positive drive from said driving shaft to said driven shaft through said driving means in response to overrun of the driving shaft by said driven shaft.

3. In a power driving mechanism having a driving shaft and a shaft driven therefrom, an overrunning clutch intermediate said driving and driven shafts adapted to transmit a direct drive therebetween, speed responsive clutch means including driving and driven clutching structures adapted for clutching action in response to substantially synchronized rotation thereof at or above a predetermined speed, means for driving one of said structures from said driving shaft, and means for driving the other of said structures from said driven shaft, the last said driving means including planetary gearing having a relatively stationary sun gear through which said driving shaft extends, said driving means being adapted to drive said structures at relatively different speeds when said driving shaft drives said driven shaft through said overrunning clutch, said clutching structures being adapted to establish a positive drive from said driving shaft to said driven shaft through said driving means in response to overrun of the driving shaft by said driven shaft.

4. In a transmission, the combination with a driving shaft and a driven shaft, of a planetary gearing including a pinion carrier for driving said driven shaft from the driving shaft at a greater speed than the driving shaft, a clutch member mounted on the pinion carrier of said planetary gearing, a second clutch member, centrifugally operated means for moving one of said clutch members into engagement with the other of said clutch members when the speed of one of said shafts reaches a predetermined point, means for establishing a two-way direct drive connection between said shafts for a direct drive and disconnecting one of said clutch members from one of said shafts, said last-mentioned means being adapted to connect the last said clutch member of the clutch with the last said shaft when direct connection between the driving shaft and driven shaft is broken.

WILLIAM B. BARNES.